United States Patent [19]

Camaisa et al.

[11] Patent Number: 5,845,263

[45] Date of Patent: Dec. 1, 1998

[54] INTERACTIVE VISUAL ORDERING SYSTEM

[75] Inventors: Allan J. Camaisa, San Diego; E. Tracy Wadkins, Santee; Karen M. Gayda, Bonsall, all of Calif.

[73] Assignee: High Technology Solutions, Inc., San Diego, Calif.

[21] Appl. No.: 491,582

[22] Filed: Jun. 16, 1995

[51] Int. Cl.⁶ .................................................. G06F 17/60
[52] U.S. Cl. ............................................. 705/27; 705/15
[58] Field of Search ..................................... 395/205, 215, 395/216, 221, 226, 227, 239; 364/464.01; 186/38, 39, 44; 705/5, 15, 16, 21, 26, 27, 39

[56] References Cited

U.S. PATENT DOCUMENTS

| | | | |
|---|---|---|---|
| 3,583,538 | 6/1971 | Hurley | 273/85 |
| 4,503,502 | 3/1985 | Chapin | 364/400 |
| 4,530,067 | 7/1985 | Dorr | 364/900 |
| 4,553,222 | 11/1985 | Kurland et al. | 364/900 |
| 4,722,053 | 1/1988 | Dubno et al. | 364/401 |
| 4,797,818 | 1/1989 | Cotter | 364/401 |
| 4,891,756 | 1/1990 | Williams, III | 364/413.29 |
| 4,992,940 | 2/1991 | Dworkin | 364/401 |
| 5,003,472 | 3/1991 | Perrill et al. | 364/401 |
| 5,128,862 | 7/1992 | Mueller | 364/405 |
| 5,218,527 | 6/1993 | Ishikawa et al. | 364/405 |
| 5,235,509 | 8/1993 | Mueller et al. | 364/405 |
| 5,262,938 | 11/1993 | Rapoport et al. | 364/401 |
| 5,353,219 | 10/1994 | Mueller et al. | 364/405 |
| 5,589,676 | 12/1996 | Iguchi | 235/7 R |

OTHER PUBLICATIONS

Diner's Web, www.dinerweb.com.
Rocky Mountain Restaurant Guide, www.mtt.com:80/th-Source/rockyMountain/restServices.html.
Simpson, Alan, Mastering Paradox Fourth Edition, Sybex Inc., 1989.
Simpson, Alan, Mastering WordPerfect 5.1 for Windows, Sybex Inc., 1992.
AD: *The Restaurant Connection.* Val–Pak, May 1995.
AD: *MICROS 2700.* Micros Systems, Inc. 12000 Baltimore Ave., Beltsville, MD.
Brochure: *TEC Pizza System.* 2160 W. 190th Street, Torrance, CA.
Brochure: *MICROS 2400 Fast Food System.* 12000 Baltimore Ave., Beltsville, MD.
Brochure: IVID Communications. Point of sale system supports. 7220 Trade Street, Suite 201, San Diego, CA.
Brochure: *TEC TST–300 Touch Screen Terminal.* 4401–A Bankers Circle, Atlanta, GA 30360.
Brochure: *SDCR Systems.* Stuart Anderson's.

*Primary Examiner*—Edward R. Cosimano
*Assistant Examiner*—Barton L. Bainbridge
*Attorney, Agent, or Firm*—John L. Rogitz

[57] ABSTRACT

A portable interactive visual ordering system and method utilizing full-color images. The system may be used by a restaurant to facilitate ordering menu items by a customer. The customer can request the system to display full-color images of a menu item as a help to decide what to order. The customer can also obtain a list of ingredients, method of preparation and nutritional information for a selected menu item. When the customer decides to order a particular menu item, the system captures the ordered item and tabulates a running bill. In another embodiment of the system, multiple visual ordering devices are networked together at the restaurant. An option in the networked system is to allow the customer to pay the bill by a credit card or debit means at his/her table. The system enables businesses to reduce labor costs in running the business and provides the customer with more information at the point of sale to make a more informed decision.

15 Claims, 10 Drawing Sheets

Microfiche Appendix Included
(1 Microfiche, 54 Pages)

Angelo's
ORDER TRACKING MENU

USER I.D. ☐
TABLE NO. ☐
SEAT NO. ☐
ORDER I.D. ☐

| 7 | 8 | 9 |
| 4 | 5 | 6 |
| 1 | 2 | 3 |
|   | 0 | 0 |

ACCEPT    CHANGE

- NEXT
- PREVIOUS
- MAIN MENU
- CATEGORY MENU
- HELP
- NUTRITION INFO
- FOOD PREP INFO
- ADD TO ORDER
- REVIEW ORDER

Angelo's
ORDER REVIEW MENU

| ITEM | QTY | | PRICE EACH | PRICE |
|------|-----|---|------------|-------|
| LASAGNE | 1 | ⊕⊖ | $12.99 | $12.99 |
| CAPPELLINI CARDINALE | 2 | ⊕⊖ | $10.99 | $21.98 |
| COCA COLA | 2 | ⊕⊖ | $ .99 | $ 1.98 |
| COFFEE | 1 | ⊕⊖ | $ .99 | $ .99 |
| SUB TOTAL | | | | $37.94 |
| TAX | | | | $ 1.71 |
| TOTAL | | | | $39.65 |

☐ ACCEPT ORDER

PRESS THE [NEXT] BUTTON FOR THE NEXT PAGE

- NEXT
- PREVIOUS
- MAIN MENU
- CATEGORY MENU
- HELP
- NUTRITION INFO
- FOOD PREP INFO
- ADD TO ORDER
- REVIEW ORDER

Fig. 15

INTERACTIVE VISUAL ORDERING SYSTEM

MICROFICHE APPENDIX

A microfiche appendix containing computer source code is attached. The microfiche appendix comprises 1 sheet of microfiche having 54 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention relates to visual transaction systems, and more particularly to a system and method for interactively ordering restaurant menu items.

2. Description of the Related Technology

The global economy has made the business of selling more competitive than ever. Businesses that do not maximize customer satisfaction and profitability will not survive in today's markets. Businesses are therefore demanding tools and methods to provide a competitive edge.

In many retail markets, advertising drives consumers to desire a product and purchase it as soon as possible. If anything stands in the way of immediate gratification, the customer may reconsider the purchase, or may go to a competitor who can provide the product immediately. Thus businesses desire ways to streamline and quicken the sales process and increase customer satisfaction, while at the same time maximizing their profits.

As an example of one type of business, the restaurant industry is suffering from increased competition and profit margins have slipped since the nationwide recession began in 1994. Restaurants who have been around for decades are now experiencing the most difficult time in history due to the extremely competitive climate.

National restaurants have been a victim of saturation and oversupply. Restaurants survive the competition by maintaining solid profit margins and increasing their customer base. Recent intensified competition has required restaurants to be innovative in order to increase sales and attract new customers. Advertising gimmicks such as coupons no longer substantially increase revenue. Restaurant profit is a function of the amount of "throughput" of customers. Restaurants need to enter into an innovative win/win marketing scheme to attract more customers and increase customer throughput and table turnover. Several problem areas and needs related to the restaurant industry such as the large ethnic population, business traveler meals and professional work habits will now be addressed.

With almost half of the population being classified as "ethnic", the explosion of Vietnamese, Chinese, Thai, Filipino, Japanese, Indian, Moroccan, Arabian, and Russian restaurants has been phenomenal in the last five years. The curiosity and appeal of ethnic restaurants is growing and although people seem to be intrigued by their cuisines, there is an apprehension about ordering food sight unseen. Often one can observe first time restauranteurs at a restaurant looking at other tables and wondering what was ordered.

National chain hotels such as Motel 8, Comfort Inn, Best Western, and individually owned hotels cater to business travelers who often arrive late in the evening. Business travelers often do not want to leave their hotel rooms to order food and resort to the traditional pizza delivery service to satisfy their appetites. Many national chain hotels do not have any intention of having food made on their premises.

Corporations have employees that work late in the evenings or through lunch on a "hot" project and would benefit from the delivery of food other than pizza or burgers. People who don't have much time for lunch often find themselves looking for the latest coupon or old menus filed away in a folder. Companies enjoy taking employees out to lunch as a team-building approach and often cannot take everyone because last minute projects come up. They often leave the front desk secretary behind to answer the phone or other employees who get caught up with last minute emergencies. These people are candidates for the use of a restaurant delivery system.

Restaurants should logically expand within the current base of customers through visible advertising. This expansion would be possible if an improved delivery service was available. An easier and faster way of ordering from a restaurant take-out or delivery service needs to be established. More employees and other potential customers would order from the delivery service if they could have the latest menu and prices. Even more people would use the service if additional information regarding the food items was available, such as a realistic image of the item, the ingredients, method of preparation and nutritional content.

People are becoming more health conscious about what they eat and often inquire about the content of food. Food preparation is becoming more and more important and the content of the preparation will reflect the general population. Menus that supply information relating to food content are becoming more important to the aging population. With more and more dual income professional households there is no time, energy or interest in cooking. People want quality food and not fast food.

Restaurants are also manually gathering data where people live and what types of menu items are in demand. Perishable food, such as seafood, requires ordering food based on the latest information available from the previous week or yesterday's restaurant activities.

People who go to restaurants often become frustrated by the inefficiency of service. For example, restaurant customers find a lot of idle time is spent trying to order or get the bill. These same customers may go to the counter to expedite the process of paying the bill.

Various systems and programs have been created in an attempt to address these needs during the past decade. For instance, U.S. Pat. No. 5,235,509 to Mueller, et al. describes a method and apparatus for facilitating self-ordering of items in a fast food environment. Customers place their own orders by touching a video console to reduce errors and theft by counter employees. This system is targeted to a high-density, short-duration fast food operation. However, in a fast food environment, where lines of customers are frequently encountered, some patrons are intimidated or confused and may require human assistance, which slows down the entire system.

U.S. Pat. No. 4,530,067 to Dorr describes a system for restaurant management and control. Remote transceivers allow a waiter to enter a table number, a seat number, and a code number for each customer. Each item in the restaurant has a code number which is input by use of numeric keypads. This system does not use a visual representation of the food items. This system does not use multiple forms of media and is not interactive with the customer.

U.S. Pat. No. 5,003,472 to Perrill, et al., describes an apparatus for order entry in a restaurant. Orders are entered on a remote terminal and sent by radio frequency to a host system. The portable terminal includes a bar code template of menu items and a light pen for scanning menu item selections. Orders are entered by scanning selections (using the light pen) in a manner similar to the use of a conventional restaurant order pad. This system does not use a visual representation of the food items. This system does not use multiple forms of media and is not interactive with the customer.

Therefore, a system is desired that addresses the immediate and specific needs of the restaurant industry: increased and comprehensive automation and a reliable method of increasing sales and profits. The current technologies in use today are lacking in these areas and many others. The existing technologies do not fully address the current trends that have become the primary focus of our society, i.e., healthy eating and immediate gratification.

A system that not only satisfies these needs but also enhances the efficiency and profitability of the restaurant industry will provide a great benefit. Such a system must provide a way for a customer to overcome the fear of ordering new food items and especially ethnic foods. Information about ingredients, preparation, and nutritional content must be readily provided, and waiting/idle time must be reduced.

A system that allows a customer to conveniently order food items from a hotel, place of business, or a home, preferably using visual methods, is also desired. A remote ordering system would allow restaurants the flexibility to tap into their customer base and increase the volume of their delivery order service. What is desired is a system that can be tailored to each specific restaurant's unique requirements.

Potential customers interested in finding a good restaurant to eat after an evening at the movies and strolling along could look at a restaurant's color interactive menu. The "satay sticks" at a Thai food restaurant, for example, could be seen on a display before entering the restaurant. Customers who never considered going into an ethnic restaurant could be enticed after seeing what the food looks like.

SUMMARY OF THE INVENTION

A computer program product is disclosed for use with a computer system including a video monitor, a central processing unit, and means coupled to the central processing unit for storing a database containing restaurant menu item characteristics and digitized photo-realistic images associated with the characteristics. As intended by the present invention, the menu item characteristics are rendered in alpha-numeric form, and can include, e.g., information about ingredients, preparation, and nutritional content of the menu items.

The computer program product includes a data storage device which in turn includes a computer usable medium having computer readable program means for permitting entry of user-generated input signals. In accordance with the present invention, the computer readable program means includes computer readable code means for causing the computer system to display the images and one or more of the characteristics associated with the image or images in response to the user-generated input signals.

Preferably, computer readable code means are provided for generating a menu item order signal in response to the user-generated input signals. In this preferred embodiment, the computer system includes a transmitter for transmitting the menu item order signal. If desired, the computer system can include a network of computers.

As envisioned by the present invention, restaurant customers can select their menu choices by viewing the images and associated characteristics on the video monitor. It will be appreciated that waiting and idle time are reduced by having a menu item order tabulated by the computer and sent to the cashier. Further, the menu order item signal may be a payment signal generated by the customer and representative of a credit card of the customer.

When the computer system includes a network of computers, a visual display screen can be located at each table in the restaurant so that the customer can place his order without having to wait for a waiter. The system can be tailored to each specific restaurant's unique requirements by use of a custom scripting language and scripting compiler. The script accesses data items, such as text, pictures, video and sound, that are stored in a central custom database structure that is optimized for speed and ease of revision.

In another embodiment of the invention, the system allows a customer to conveniently order food items from a hotel, place of business, or a home using visual methods. Remote computers, workstations, and terminals can connect over various forms of communication media to the central database structure, thus allowing the customer to see and receive information about the desired item.

In another aspect of the present invention, a portable, interactive restaurant visual ordering system using photo-realistic images includes at least one portable computer including a data input device. A video monitor is electronically connected to the computer, and a set of photo-realistic images are digitally accessible to the computer. Further, a set of food item characteristics are digitally accessible to the computer and presentable in alpha-numeric form, wherein at least some of the characteristics are associated with at least one of the images. Computer readable code means are digitally accessible to the computer for displaying one or more of the images and one or more of the characteristics associated with the image or images on the monitor in response to manipulation of the data input device.

In yet another aspect of the present invention, there is an interactive restaurant visual ordering system utilizing photo-realistic images, the system comprising a first subsystem comprising a portable computer with a memory; a color visual display electronically connected to the computer; a set of photo-realistic images stored in the memory; a restaurant menu stored in the memory, a portion of said menu displayed on the visual display; a computer program stored in the memory enabling a customer of the restaurant to order at least one menu item, wherein the computer displays a full-color image representative of at least one menu item to the customer on the visual display, and wherein the program controls the display of the image based on interactive use of the menu on the computer by the customer; a second subsystem comprising a portable computer with a memory; a color visual display electronically connected to the computer; a set of photo-realistic images stored in the memory; a restaurant menu stored in the memory, a portion of said menu displayed on the visual display; a computer program stored in the memory enabling a customer of the restaurant to order at least one menu item; and a network of interactive visual ordering subsystems.

The details of the present invention, both as to its structure and operation, can best be understood in reference to the accompanying drawings, in which like reference numerals refer to like parts, and in which:

BRIEF DESCRIPTION OF THE DRAWINGS

FIG. 14 is an exemplary Order Tracking Menu display illustrating the access to order information; and FIG. 15 is an exemplary Order Review Menu display illustrating ordering functions;

DETAILED DESCRIPTION OF THE PREFERRED EMBODIMENTS

Figure 1:
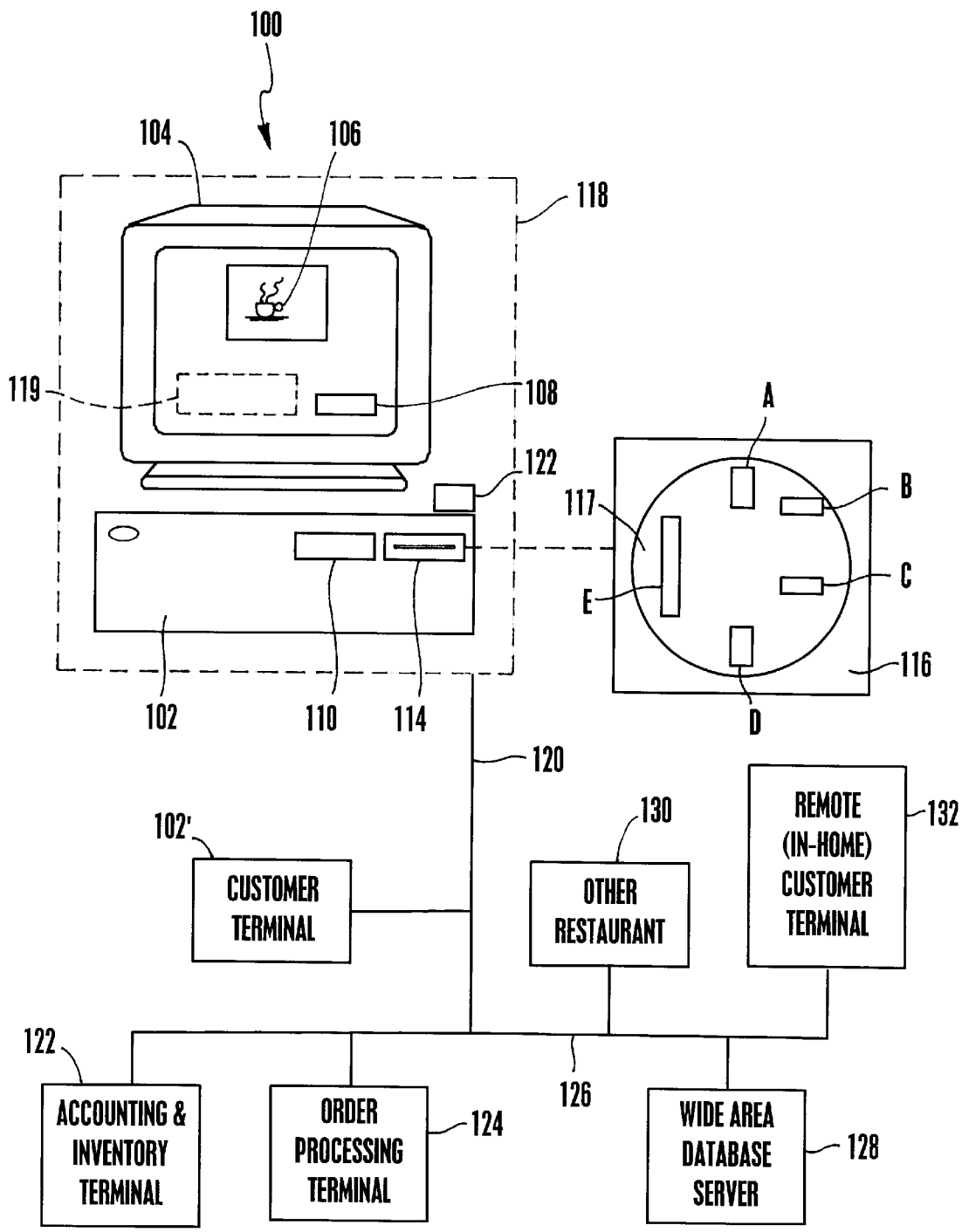
FIG. 1 is a block diagram of an exemplary hardware configuration for the multimedia marketing system, which is the preferred embodiment of the present invention.

Referring initially to FIG. 1, a computer system for enabling a restaurant customer to interactively view photo-realistic images of menu items, along with alphanumeric characters representative of the items, is shown and generally designated 100. As shown, the system 100 includes at least one computer 102 having an associated video monitor 104 on which a photo-realistic image 106 of a menu item, along with alpha-numeric characters 108, e.g., price, nutritional information, etc., that are associated with the item 106, can be displayed. It will accordingly be appreciated that memory accessible to the computer 102 can contain a set of digitized images and a database of alpha-numeric characters associated with the images, as well as sound tracks associated with the images. It is to be understood that the computer 102 can be any suitable portable computer with associated monitor and data storage, such as a personal computer or laptop computer.

Additionally, the computer 102 includes a data storage element 110. In the embodiment shown, the data storage element 110 is a hard disk drive. Also, the computer 102 can include a so-called floppy drive 114 with which a floppy diskette 116 can be operatively engaged.

In any case, it is to be understood that the system 100 includes a computer program product which enables a customer to view and order menu items using the computer 102, and this program product may reside, for example, in RAM of the computer 102, on the hard drive 110, or on the floppy diskette 116. Or, the program product may be stored on a DASD array, magnetic tape, electronic read-only memory, optical storage device, or other appropriate data storage device. In an illustrative embodiment of the invention, computer-executable instructions related to the program product may be lines of compiled C++ language code and/or Visual Basic language code.

The Figures described below illustrate the structure of the computer program product of the present invention as embodied in computer program software. Those skilled in the art will appreciate that the Figures illustrate the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures. An exemplary machine component is shown as the diskette 116 in FIG. 1 having a combination of program code elements A–E in computer readable form that are embodied in a computer-usable data medium 117, on the diskette 116. As mentioned above, however, such media can also be found in semiconductor devices, on magnetic tape, and on optical disks.

In accordance with principles well-known in the art, the computer 102 includes a data input device, such as the touch-sensitive portion 119 of the screen of the monitor 104. Alternative input devices can include keyboards, keypads, and a computer mouse.

As intended by the present invention, the computer 102 can be a stand-alone computer that may be fixedly or movably wall- or table- or kiosk-mounted in a dining room 118 of a restaurant. Alternatively, the computer 102 can be operably connected to a network 120, such as a local area network (LAN). In the preferred embodiment, the LAN network 120 is wireless, and the computer 102 consequently includes a radiofrequency (rf) or infrared (IR) transmitter 122 for transmitting control signals generated by the computer 102 in response to, e.g., manipulation of the touch sensitive portion 119.

When the computer 102 is part of the network 120, other computers 102 can also be part of the network 120. Further, the network 120 can include a computer for establishing an accounting and inventory terminal 122 which may be located, for example, in an office of the restaurant. Moreover, the network 120 can include a computer for establishing an order processing terminal 124 which may be located, for example, in the kitchen of the restaurant. Still further, the system 100 can include a wide area network (WAN) 126 which is in data communication with a wide area distribution server 128, other restaurants 130, and remote terminals 132 that can be located in private residences. The WAN 126 can include telephone lines, the Internet, fiber optics, T1/T3 communications, cable television, and broadband networks.

For convenience, the following description will be outlined into the following seven principal sections: General Configuration, Restaurant Implementations, Menu Creation Process, Database Structure, User Interface, Menu Screens and Conclusion.

I. GENERAL CONFIGURATION

Figure 2:
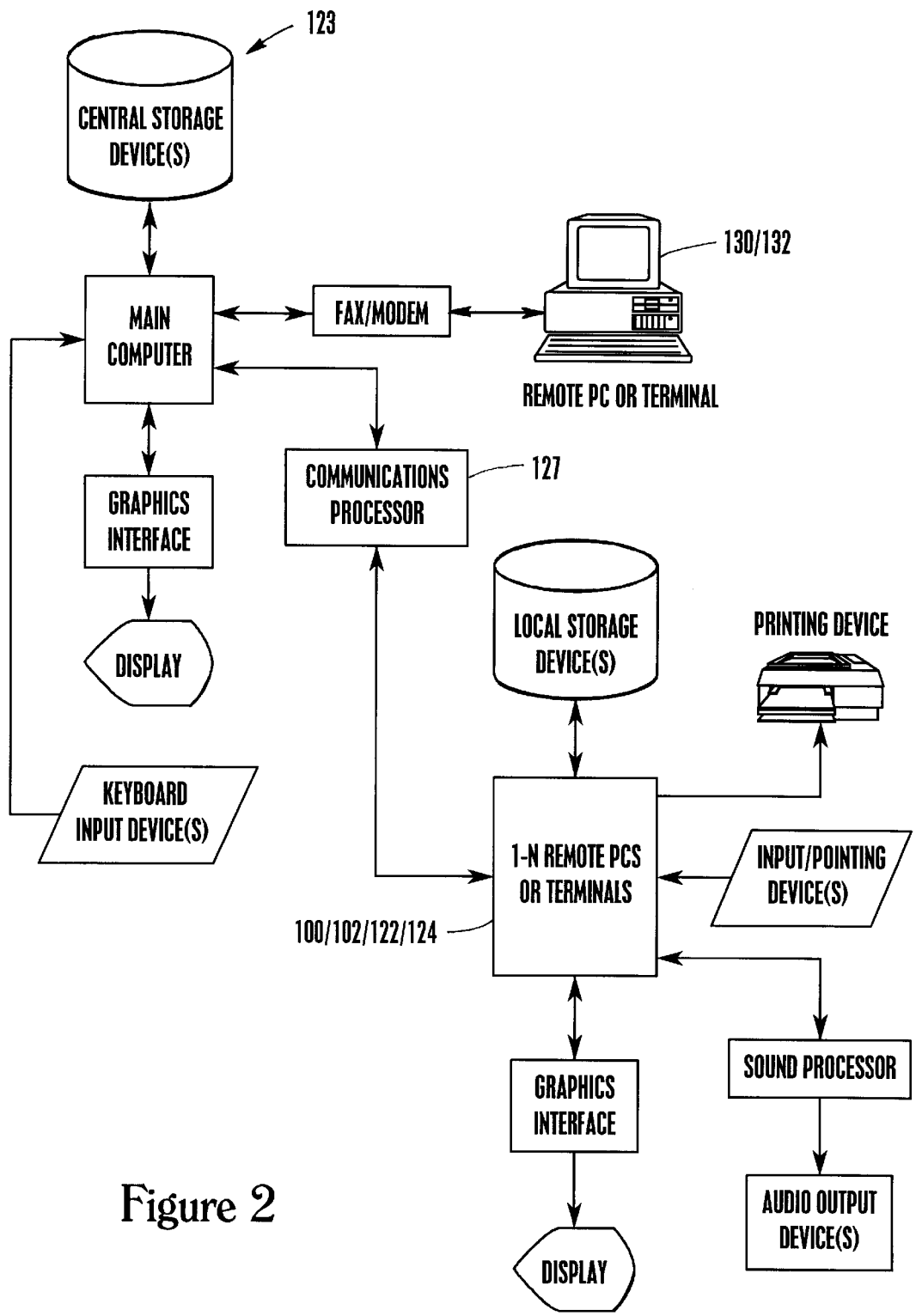
FIG. 2 is a block diagram of an exemplary hardware component implementation to represent one possible embodiment of a multimedia marketing system.

As shown in FIGS. 1 and 2, an interactive visual (menu) ordering system (IVOS) 100, comprised of a computer and software, is also referred to as the "Multimedia Marketing System". Referring to FIGS. 1 and 2, an embodiment of an IVO system of the present invention is generally indicated at 100. As shown in FIG. 1, the IVO system 100 can be installed as part of a network configuration. Alternatively, the system 100 can be operated in a stand-alone configuration. The system 100 can be used in virtually any application where it is desirable to provide a visual product selection and/or conduct a sales or service transaction.

One such application is shown in FIG. 1, which shows the IVO system 100 in a network configuration. The system 100 includes four subcomponents: a Multimedia Database, a Communications Processor, an Inventory, Purchasing and Accounting Processor, and a Point of Sales Interface. Using easily available and upgradeable commercial-off-the-shelf components, it is an inexpensive, yet highly capable means to increase efficiency of retail operations.

The purpose of the IVO system 100 is to provide the customers of a business with remote access of product information, including product descriptions, prices, and sales and delivery information. Thus, the products of that business can be ordered from home or office. It is perhaps best visualized as a reverse telemarketing system.

Vendors of products can maintain a multimedia database containing digitized photos or other video data, sound and text descriptions of products. This database is accessible via customer terminals located in the vendor's place of business, the consumer's home or office, or on any computer running point-of-sale software associated with the system 100.

FIGS. 1 and 2 show block diagrams of a complete system 100. All or part of this system can be integrated to provide a business (at location 102) with varying display capabilities. The system contains a local multimedia database on a floppy diskette 116 or a hard drive 110 in a computer usable data medium 117, which contains the vendor's product information, stored on a multimedia database server 128 that is linked with a WAN (wide area network) 126 or a LAN (local area network) 120 to a customer terminal 102, an accounting & inventory terminal 122, an order processing terminal 124, other restaurants 130, a remote customer terminal 132, etc.

An external communication media such as a network 120 and a WAN 126 provide a communications link to customers (at a remote location 132) of a business directly or indirectly through a wide-area database server 128. The wide-area database server 128 can contain the product information of many vendors (such as at 102 and 130). The server 128 provides a product query function and information forwarding service to the customers on all available sources of the product(s) being queried.

The computer usable data medium 117, when engaged with the system 100, interfaces to many different types of communications media, including Local Area Networks (LANs), RS232 modems, telephone lines, the Internet, fiber optic communications, T1/T3 communications, cable television, and broadband networks.

The communication media actually used depends on the availability of the media to the customers within a given geographic area. The customer's interface is a personal computer 100 (FIG. 2) with multimedia capability and an external communication interface, such as, a modem or cable television data service.

A. Vendor's Location

An embodiment of the invention includes a plurality of components at the vendor's location 118. These components may include the Customer Terminal 102, the Accounting & Inventory Terminals 122, the Order processing Terminals 124, the Wide Area Multimedia Database Server 128 with network 120 or WAN 126. Computer usable data medium 117 on floppy diskette 116 may be stored and/or accessed on a hard drive 102 or a wide area database server 128. These components will be further described hereinbelow.

In another embodiment of the invention, the function of one or more of the above components may be combined into one unit or omitted, as needed by a particular business. For example, a business may not have a need for the WAN 126 at a particular time or a wide area database server 128.

Customer Terminals

The Customer Terminals 102', also referred to herein as "local terminals" are user-friendly, interactive terminals capable of presenting digitized photos, video clips, text description/specifications, and related audio clips. The user is presented with a touch screen menu that directs them through the available menu topics and presents them options to view or listen to information relating to a request. The user is capable of ordering the vendor's product or service as an option.

The customer terminals 102 typically would access only the local (the vendor's own) database for products or services and store the data on its own hard drive 110 or CD ROM drive (116) so that the user may view or listen to the products and or services offered by the vendor. The local terminals also have a screen saver function that have the capability to display digitized photos of the vendors products in order to attract customers to the terminal at the vendor's place of business.

Customer terminals may consist of a personal computer (PC) 100 with a graphical user interface (GUI) capable of displaying at least 640×480 pixels×256 colors, a hard drive, a user input device (such as a 101 keyboard, touch screen, mouse, pointing device, or other input device), a minimum of eight Megabytes of random access memory (RAM), and a communications port (such as a serial port or LAN interface). A sample Customer Terminal hardware configuration is shown in FIG. 2. Each terminal preferably includes a touchscreen monitor such as those available from Micro-Touch Systems, Inc. in Methuen, Mass. or other monitor/pointing device combination for interface and viewing. The presently preferred personal computer is of the IBM-PC compatible type, although other personal computer types and manufacturers, such as the Apple Macintosh, Power-PC, and Unix workstations may be adapted for use in the invention.

The capability of the Customer Terminals 102 varies slightly from vendor to vendor, depending on the product or services provided. Each Customer Terminal 102 is capable of displaying digitized photos, video, sound and text separately or concurrently (if applicable). The primary input device of the Customer Terminal 102 is a touch screen display but could also be a mouse, keyboard or alternate input device as shown in FIG. 2.

After a vendor-defined time period, the Customer Terminal 102 enters a "screen saver" mode of operation which displays random product photos and (optional) sound in order to attract passing consumers to the Local Terminal.

The Customer Terminal 102 has the capability to download the current database from the wide area database server 128 and store the data files locally. The Local database contains only product information and does not contain vendor confidential data (such as vendor costs).

The main software program of the Customer Terminal 102 includes a windowed presentation of the available data for various products and services.

Workstation Terminals

The accounting & inventory computer 122 and order processing computer 124 hereinafter referred to as "workstation terminals" are custom designed, using off-the-shelf hardware and software components, for the function they perform. For example, a kitchen remote order processing unit displays the orders to be filled and accepts user inputs to indicate that orders are ready for pickup and to update the order status. A stock room terminal displays orders to be filled and where the items can be found in the stock room. A shipping terminal displays all of the items that make up a shipping order and shipping instructions.

Workstation terminals 122 and 124 used for other than displaying images are similar to the customer terminals 102 except that the display capability does not need to be as good in some circumstances, e.g., the display may be monochrome. In one presently preferred embodiment a Workstation terminal 122, 124 includes a PC with minimal graphics, a hard drive, four Megabytes of RAM and a keyboard or touch screen. The primary input device to the Workstation terminals 122, 124 varies depending on the function of the workstation. For example, a workstation at the cook's station in a restaurant may use a touch screen for input, whereas a stock room station may use a scanner and a keyboard, etc.

As presently preferred, the Workstation terminal 122, 124 software includes all of the Customer Terminal 102 software, and further includes software unique to the Workstation terminal 122, 124. Alternate input devices (such as keyboards, scanners, mice) and output devices (such as printers) can be utilized in this configuration. The Workstation terminals 122, 124 interact via communications devices with other terminals and report functional transactions to the relevant. For example, a shipping station reports completion of a shipping order to the accounting processor to update billing records, and to update time of delivery information.

The Workstation terminal 122, 124 communicates with processors in other terminals, such as terminals 102, to update various order, product, and sales transaction status fields in various databases. Communications may occur, for example, via modem, LAN 120, or serial communication. The means of communication is based on vendor data traffic.

Multimedia Database Server

The Multimedia Database Server functions can be performed by the workstations 122, 124 to store data relating to vendor products or services. The wide area database server 128 responds to customer data queries and vendor updates. As orders are taken, messages are sent to the Accounting-Inventory Terminal 122, detailing changes in inventory and transaction information.

In one presently preferred embodiment, the wide area Multimedia Database Server 128 is connected with one or more PCs with a graphics interface and a display capable of displaying at least 1280×1024 pixels×256 colors, at least one hard drive capable of storing all of the multimedia data, a keyboard, a mouse, 16 Megabytes of memory, and a Local Area Network (LAN) 120 interface. A backup device for the server includes a commonly available 4 mm digital audio tape (DAT) module or similar device with like capabilities. The Multimedia Database server 128 communicates with processors in other terminals via a LAN 120 using commonly available network software, such as, for example, Novell NETWARE 3.x/4.x or Microsoft Windows NT.

The Multimedia Database Server 128 (122, 124) stores a Multimedia database. The Multimedia database contains multiple database files. Each file includes one type of data. Each record is identified with a header structure that identifies the data type and format. An index file contains a file of record structures that includes pointers to the various database files. The multimedia database structure is in accordance with Visual Basic programming system for Windows, version 3.0 Professional.

The Multimedia Database includes a security module that limits access to particular functions and data. The security access file is accessible to the Multimedia Database Operator (Vendor or authorized employee) only. Operator utilities include database maintenance software for updating databases and index files, database reconstruction utilities, security password and privilege software, and database backup software.

The Multimedia Database Server 128 (122, 124) processes all updates to the databases. It also maintains an update log file in order to reconstruct a database in the event of a hard disk crash.

Communications Processor

The Communications Processor 127 functions could be fulfilled by most commercial off-the-shelf networking hardware, e.g. LAN's 120, WAN's 126, the Internet or other BBS system capable of routing data requests to and from the Multimedia database server 128. Local communications include the Customer Terminals 102, Workstation terminals 122, 124 and the Multimedia Database server 128. External communications preferably includes a LAN 120 connection and may include one or more of the following: FAX, Modem, telephone line, Internet, fiber optics, T1/T3 communication, SONET, cable television, or broadband network.

The software for the Communications processor 127 responds to external data and transaction requests. The processor acts as an intermediary between the remote user(s) and the Multimedia database server 128 so as to ensure that the database does not become corrupted by an external user performing unauthorized functions, such as updating the database.

The communications processor 127 is capable of detecting the version and capabilities of the user's version of the IVO system software or responding as a Bulletin Board System (BBS) in a text mode only. The Communications processor software responds to the IVO system software and determines the user's capabilities and formats all responses based on this information. The first message sent to the user's version of the IVO system software instructs the software of its querying capabilities with this vendor.

If the user does not have a version of the IVO system software, the communications processor software asks the user for the type of processor they are using, the capabilities of the processor, and if there is a version of the software that will run on the user's system. The communications processor software then offers to download the version of software that will run on the user's system. If the communications processor software doesn't have a version compatible with the user's processor, the program then acts as a BBS and responds to text-only queries.

Accounting-Inventory Processor

The Accounting-Inventory Terminal 122 maintains a database of on-hand inventory, cost and purchasing information for product and transaction information. The Accounting & Inventory terminal 122 is capable of printing daily transaction, shortage, and inventory reports.

The Accounting-Inventory terminal 122 typically includes one or more PCs with minimal graphics capabilities, a large hard drive, 16 Megabytes of memory, a LAN interface, and a printer interface.

B. Multiple Vendor Data Server

An embodiment of the invention includes a plurality of components at a multiple vendor data server location 102. These components may include the Communications processor and the Wide Area Multimedia Database Server 128 with a large area multimedia database, and the external communication media 120, 126. In another embodiment of the invention, the function of one or more of the above components may be combined into one unit, as needed by a particular business.

Large-Area Multimedia Database Server

The Large-Area Multimedia Database server (LAMDS) 128 acts as a central database for consumers requests for products or services. The LAMDS 128 searches multiple vendors for products and service, and provides multimedia data to the consumers for those inquiries and direct ordering services. In one presently preferred embodiment the LAMDS 128 includes multiple PCs identical to the Multimedia Database server 122, 124 but with a much larger disk storage capacity.

Large-Area Multimedia Database

The Large-Area Multimedia Database stored on the server 128 consists of multiple multimedia databases linked via a communication system. The large area database is updated by the individual vendors (such as at location 102) on a periodic basis with their current product information.

C. Consumer

An embodiment of the invention includes a plurality of components at a remote customer location which includes Remote customer terminals 132 and the external communication media 126. The remote customer terminals 132 are further described herein below. The external communication media 126 provide a communications link to customers (at location 132) of a business directly or indirectly through the wide-area multimedia database server 128.

Remote Terminals

The Remote customer terminals 132 provide consumer access to the individual or Wide Area Multimedia Database servers 128 via modem or cable television data access. The remote customer terminal 132 displays text and (optional) graphics, as well as audio information (if supported) relating to consumers product inquiries. The terminal is also capable of placing orders to vendors for products or services.

The Remote customer terminals 132 typically include customer-owned IBM compatible PCS with a graphics interface capable of displaying 1280×1024 pixels×256 colors, a user interface (such as a keyboard, mouse) and a storage device capable of storing retrieved data.

The Remote terminals 132 have the same capabilities as the customer terminals 102, but do not implement any capability that is not detected by the program during initialization, e.g. sound bits.

In addition to the functions common to the customer terminals 102, the Remote customer terminals 132 have the ability to initiate communications via modem to the vendors Wide-Area Multimedia Database server 128. All commands to and from the server 128 contain a header that tells the Communications processor what the customer's hardware capabilities are and what data type it can display.

II. RESTAURANT IMPLEMENTATIONS

One application of the IVO system 100 is for the restaurant market. Several possible configurations for the IVO System 100 will now be discussed.

Portable PC Implementation

A first implementation of the IVO system 100 in a restaurant setting includes a IVO PC (personal computer) based visual menu system. In reference to FIGS. 1 and 2, this implementation combines the functions of the Customer terminal 102 and the Multimedia Database server 122, 124 in an off-the-self personal notebook computer. The presently preferred computer is a Dynapad T200CS available from Toshiba that includes an Intel i486 microprocessor, four Megabytes of RAM, an 80 Megabyte hard disk drive, and a 9.5 inch diagonal color screen (256 simultaneous colors).

The computer utilizes Windows for Pen Computing version 3.1 or newer, and Microsoft DOS version 6.0 or newer. The IVO system software program, which is written in Borland Turbo C++ version 4.0 and Visual Basic 3.0 runs in a Microsoft Windows environment and provides the user with a list of items available, color pictures, ingredients, nutritional information and the like in a "screen saver" mode that will revert to a menu ordering system at a touch of the screen. The waiter/waitress may carry the unit to each table or the unit may be a fixed mount at the table to let customers visually choose their selections.

The windows based system maintenance software program is structured as follows: The program administrator inputs digital pictures one at a time from a diskette or CD into the Multimedia Database Server. As each picture is input, the program prompts for a menu number, category, description, name of dish, price and other pertinent information determined by the program administrator. User input fields are available for individual customization of the application. After the user completes the input of pictures, he/she accesses the pictures and information by a free-form search of category, name, number, description and the like, or by viewing up to 16 pictures per screen. Manipulation of the information is available in several methods that accommodates menu setups, categories, daily specials, chef's suggestions, pricing changes and the like.

The IVO notebook PC is a powerful self-contained user input driven program. The IVO notebook PC basic package includes a IVO PC notebook computer, and a video and instruction manual for operation and use. Digital camera is optional. Presently preferred digital camera is DCS420 available from the Eastman Kodak Company which provides photo realistic full-color digital images of the menu items.

Standalone Kiosk Implementation

As a second implementation, the IVO system 100 can be configured to operate as a stand-alone kiosk unit, for example, at the front of a restaurant. The presently preferred stand alone (SA) kiosk includes a Kiosk 2000 Model 300 station with a MicroTouch 17" Touch Monitor, Magnetec printer Model 4920 and Sony SR58 Speakers available from MicroTouch Systems, Inc., Methuen, Mass. and an IBM PC compatible personal computer as described for the Customer terminal 102. The SA kiosk uses Microsoft Windows 3.1 or newer and Microsoft DOS 6.0 or newer as the operating software as well as the software drivers accompanying the Touch Screen.

The primary function of the SA kiosk is to entice restaurant walk-by traffic to enter the restaurant by giving them a visual preview, via a screen saver program, of the culinary selections available. The SA kiosk system remains in the screen saver mode, previewing the entire menu selections, until touched anywhere on the screen. At that point, it reverts to a menu system allowing the user to choose from several categories of food, submenus, and then more specifically the information regarding calorie content, ingredients, preparation, nutrition and pricing. The potential customer is able to visually identify his/her selection and then further select their meal according to their dietary requirements.

Portable PC with Wireless LAN

A third implementation adds communications capabilities to the visual menus via the IVO notebook PC computer. In this implementation, the IVO notebook PC has the capability of communication with a central server computer via a wireless Local Area Network (LAN) 120. Wireless LAN cards are available from a variety of sources, such as the NCR WaveLAN or the Solectek AIRLAN.

Users (i.e., waiters/waitresses) of the wireless PC transmit orders directly to the kitchen or bar, including all customer selected items, preparation requirements, special dietary requirements, and so forth. A display in the kitchen, for example, could list the orders, cooking instructions (rare, medium, etc.) and table. When the meal is ready, the waiter/waitress is notified via their wireless PC. Additionally, when the table is ready for their check, the waiter/waitress can send the check information to the front register by using their wireless PC.

The computer screens can be fixed at their tables to allow for ease and efficiency of ordering. The chef can prepare the food and the customer does not have to wait for availability of the waiter/waitress during peak hours. Having the screen at the tables reduces the amount of "dead" time waiting to order and paying for the bill. For example, the customer inputs data into the visual display computer along with their credit card number. A credit card scanner could be included with the table display for this purpose. The IVO system 100 totals the bill and prints it out.

A portion of the software programs which are executed on the hardware shown in FIGS. 1 and 2 are included in the attached microfiche appendix. The source code is written in Turbo C++, version 4.0, available from Borland and Visual Basic, version 3.0, available from Microsoft.

Remote Ordering from a Restaurant

A fourth implementation in a restaurant setting includes remote access to the restaurant's menus and remote ordering capabilities. A communication server 127 (such as shown in FIG. 2) is added to the network to allow potential customers to view the menu and daily specials using their own PC with a modem, fax machine or Internet link. For example, employees can order food from their PC at work and view the actual pictures of the food before ordering. The communication server 127 can also fax or E-mail the daily specials to select customers at their request.

The order information is placed automatically in the database for order processing. This information is related to the chef on the order processing terminal 124 located in the kitchen. The order is placed without human intervention and prepared and delivered in a timely manner.

An extension of the remote network implementation includes cable television advertising and ordering capabilities. In this implementation, customers can place orders using the phone, a home computer or "interactive TV." This is accomplished much the same way the current shopping channels show their merchandise and then take phone orders; food is ordered and delivered as well. Delivery areas are defined by a predetermined radius, e.g., a 5–15 mile radius, and offered by locale on the local cable networks already in place. Consumers have the option of reserving tables at restaurants by using this system and guaranteeing their reservation and block of time, e.g. two hours, with a personal credit card. With the success and availability of the cable television shopping channels, it is a logical step to progress into a IVO channel. Restaurants and consumers alike benefit from this advancement.

III. MENU CREATION PROCESS

Menu categories, food items for each category, nutritional and preparation text are entered in a database for each food item. Importantly, the food items are associated with an image of that food item by means well-known in the database art. This data is stored on the local database of the stand alone units or on a common database for networked implementations.

IV. DATABASE STRUCTURE

The multimedia database is created using commercially available relational database management software. Initially Microsoft Access will be used. Other relational database packages such as Paradox, Oracle, or Sybase may be used for different implementations of the product.

Operation

The Multimedia database employs a normalized relational data model. Index files are generated using the relational database management system (RDBMS) to increase the system performance and allow rapid random access to individual data items.

Database Object

The data are grouped into logical entities or database objects to increase speed and flexibility of the different implementations of the IVO products. For instance, a food item has associated with it, a picture, a description, an availability, a food category, etc. All of these items grouped together represent a Database Object. Index files allow for rapid access to each individual Database Object that requires an index.

V. USER INTERFACE

A customer of a particular business, such as a restaurant, interacts with the IVO System 100 under a variety of conditions. One is when the customer arrives at the restaurant and is awaiting service. Another is when the customer is seated at a table making choices from available selection. A third is when a customer is at a remote location, such as at home, and has a computer connected to a communication network (i.e. phone lines) and logs into the IVO System 100 for the purpose of browsing selections or ordering. Each situation involves consideration of a menu selection based on the presentation of color photo-realistic images and text describing the item. The computer displays are configured so as to allow intuitive understanding of the functions by the user.

The user interface and menu screens described below represent an exemplary implementation of the interface between the IVO system and the general public users.

A. Main User Interface

Figure 3:
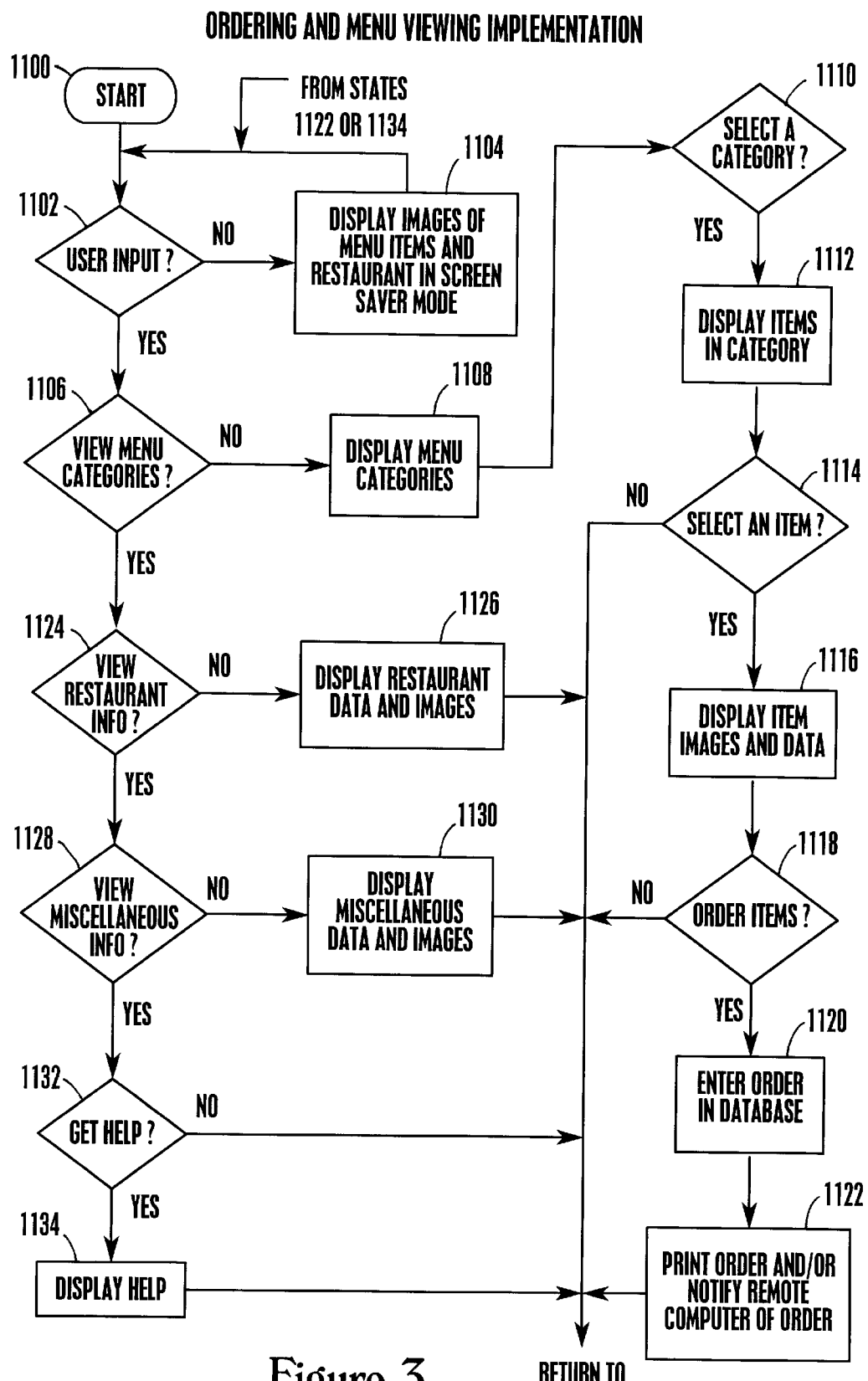
FIG. 3 is a flow diagram inclusive of the different implementations of the IVO system.

Referring to FIG. 3, a flow diagram of a main user interface will be described. This defines the processing performed by the IVO System 100 from initial customer contact to completing and tabulating the order. In this context and setting, the customer or the wait person assisting the customer may be the users of the IVO System 100.

Figure 6:
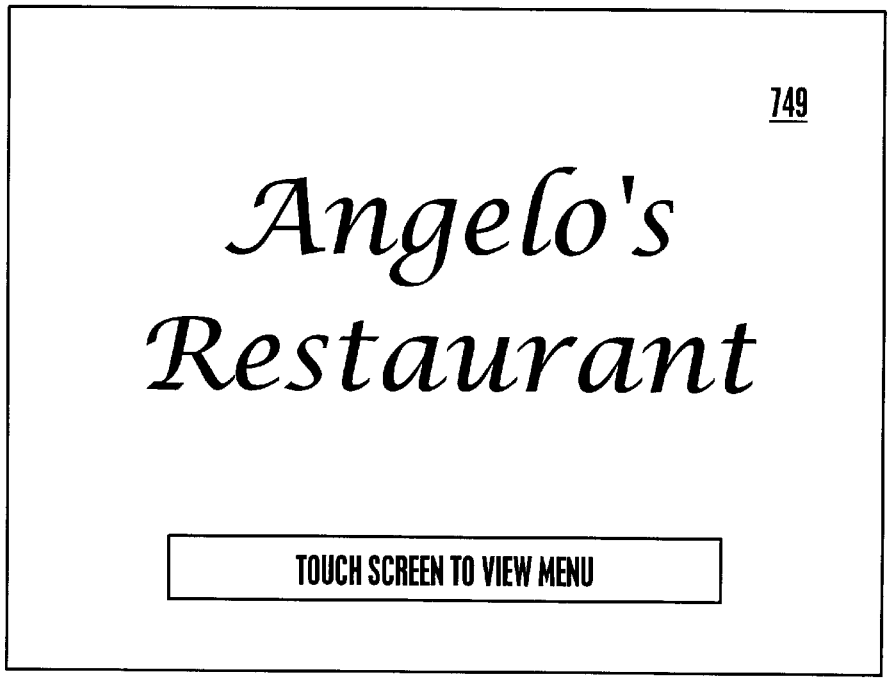
FIG. 6 is an exemplary business logo display illustrating an example of an opening screen.
Figure 7:
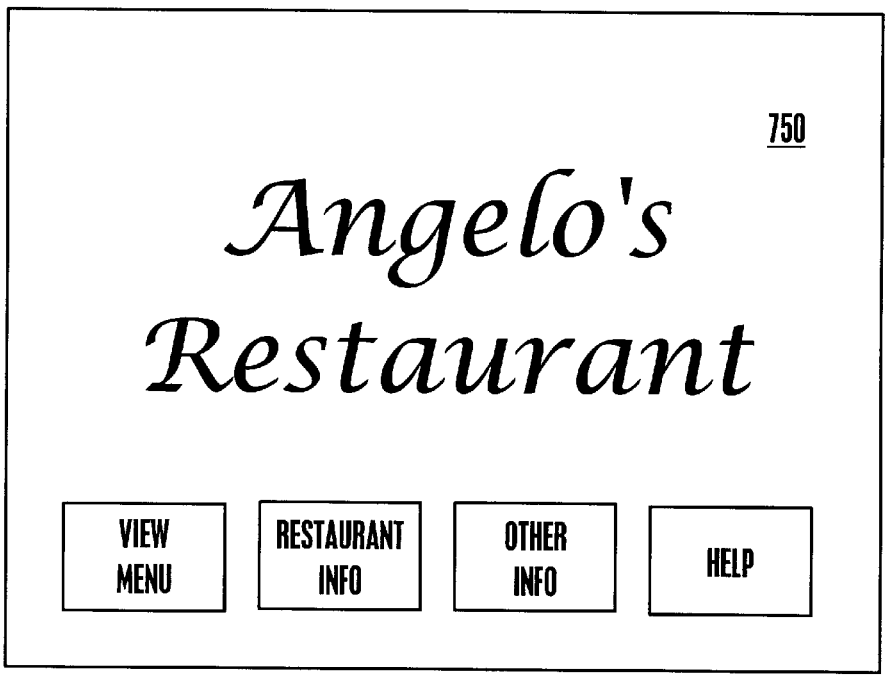
FIG. 7 is an exemplary main menu screen illustrating main category selections.

Beginning at state 1100, the system 100 performs initialization tasks in accordance with principles well-known in the art and then moves to state 1102 where the system displays the vendor logo and waits for user input. An exemplary logo display 749 is shown in FIG. 6. At state 1102, the screen offers the user 4 choices, an exemplar of which screen 750 is shown in FIG. 7, e.g. View Menu Categories (state 1106), Restaurant Info (state 1124), Other Info (state 1128) or Help (state 1132).

If there is no user input at state 1102 (also applies to all other states except 1104), after a predetermined time period has elapsed the program moves to state 1104 ("screen saver") and displays images of the restaurant and menu items until the screen is touched. In the "screen saver" mode the system 100 cycles through and displays the photo-realistic color images of all the menu items stored in the database, as well as a description of each. A message encouraging a user to touch the screen is also displayed (FIG. 6). The system remains in state 1104 until the screen is touched, then reverts back to state 1102.

B. View Menu Categories Function

If input is received at state 1102, i.e. the user selects View Menu Categories, state 1106, from the four choices (FIG. 7), the system 100 moves to state 1108 and displays the main menu options available. (An exemplary category display screen is shown in FIG. 8.)

Figure 8:
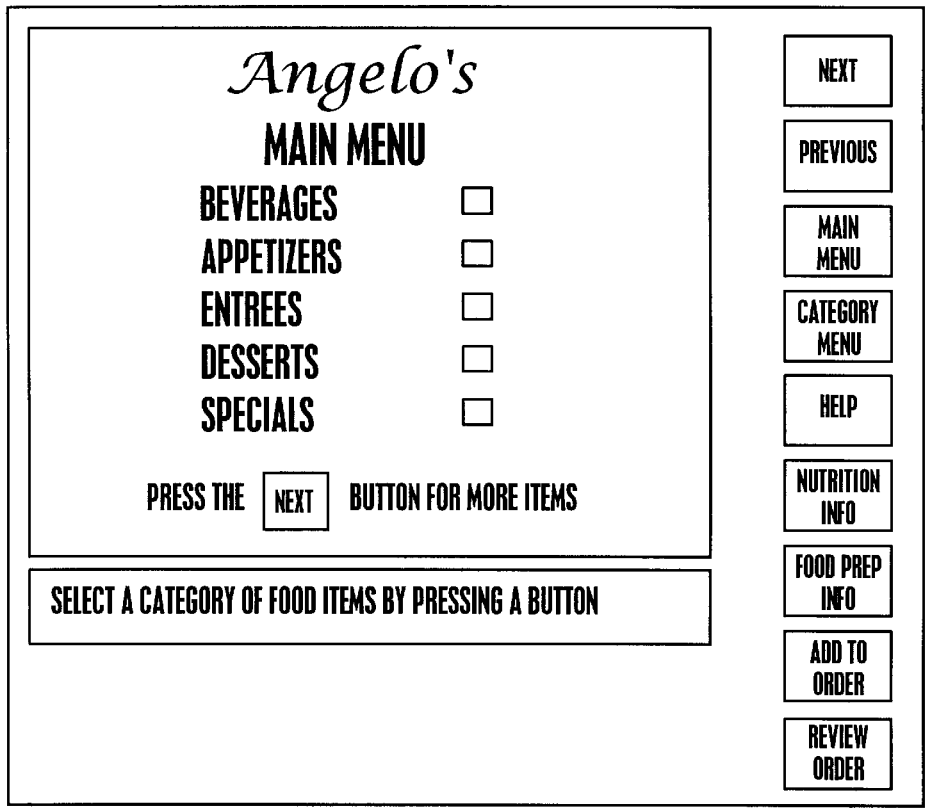
FIG. 8 is an exemplary Main Food Order Menu display illustrating item category selections.
Figure 9:
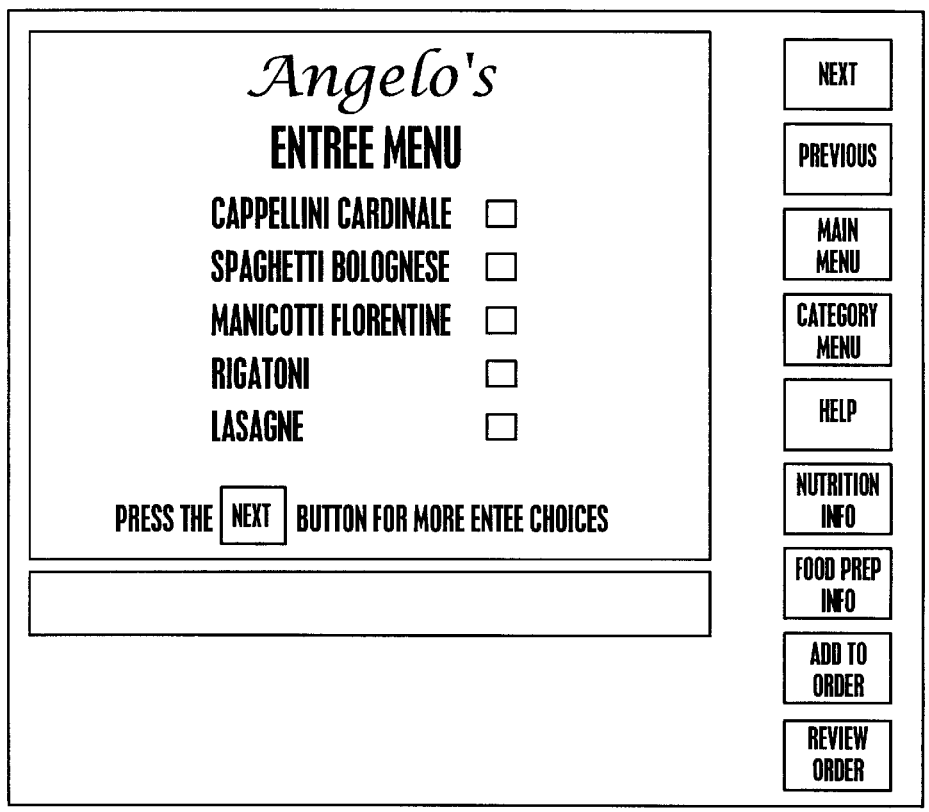
FIG. 9 is an exemplary Category or Entree menu display illustrating specific item selections.
Figure 10:
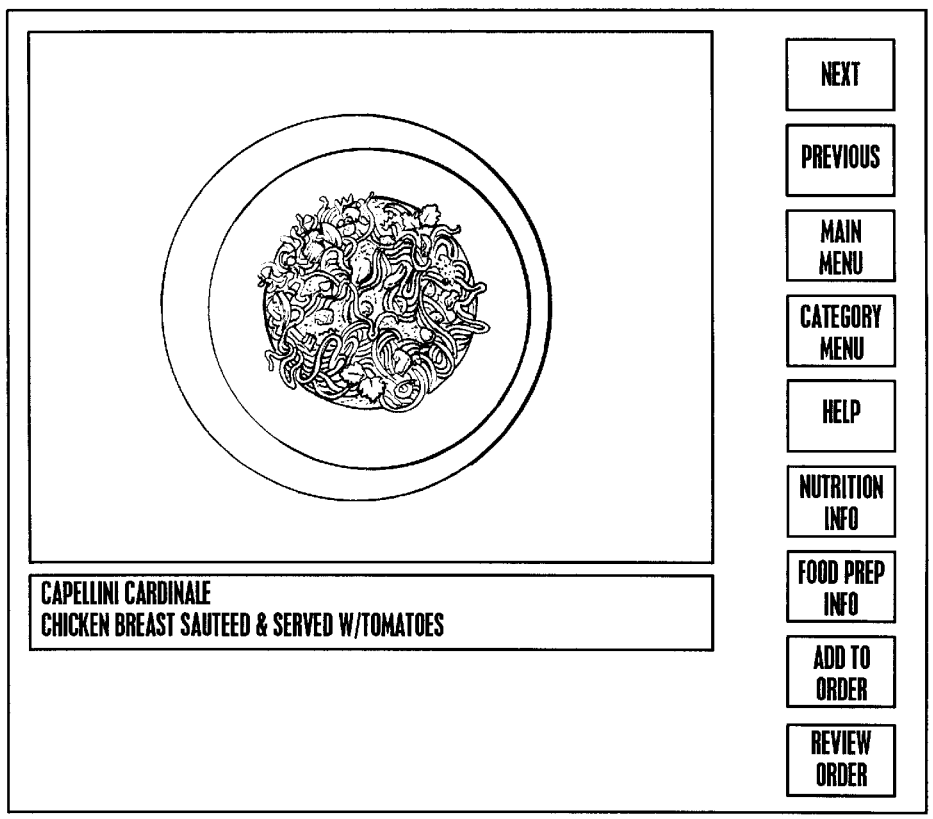
FIG. 10 is an exemplary food item display of a photo-realistic image and data of a menu item selection.
Figure 11:
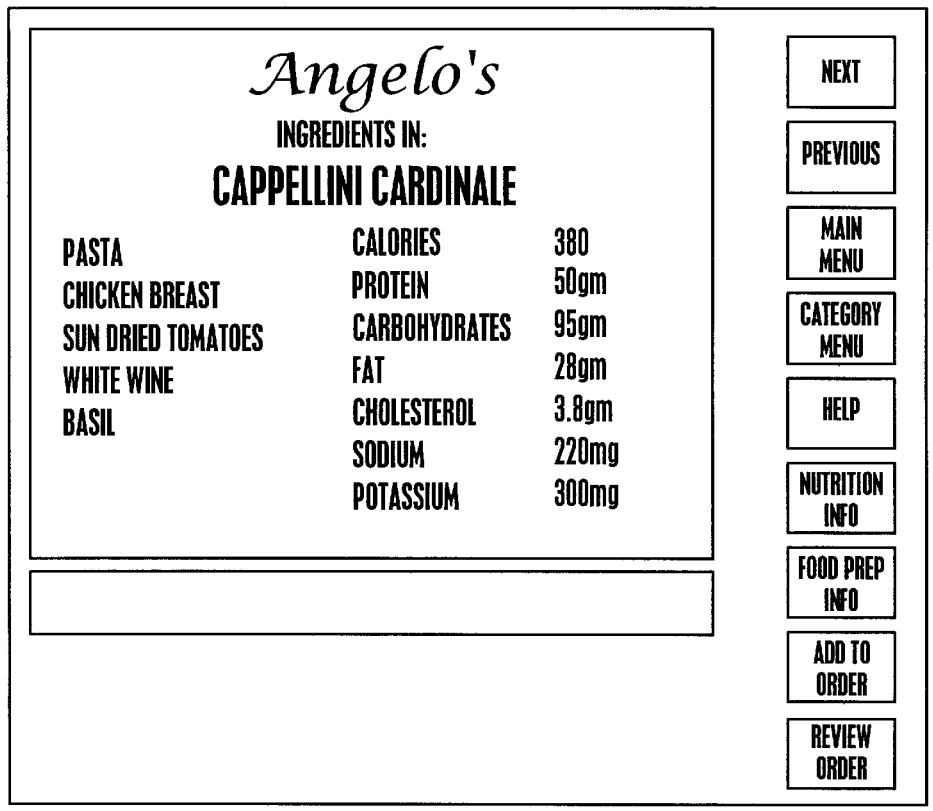
FIG. 11 is an exemplary Nutritional Information display illustrating the types of information that may be available with each menu item selection.
Figure 12:
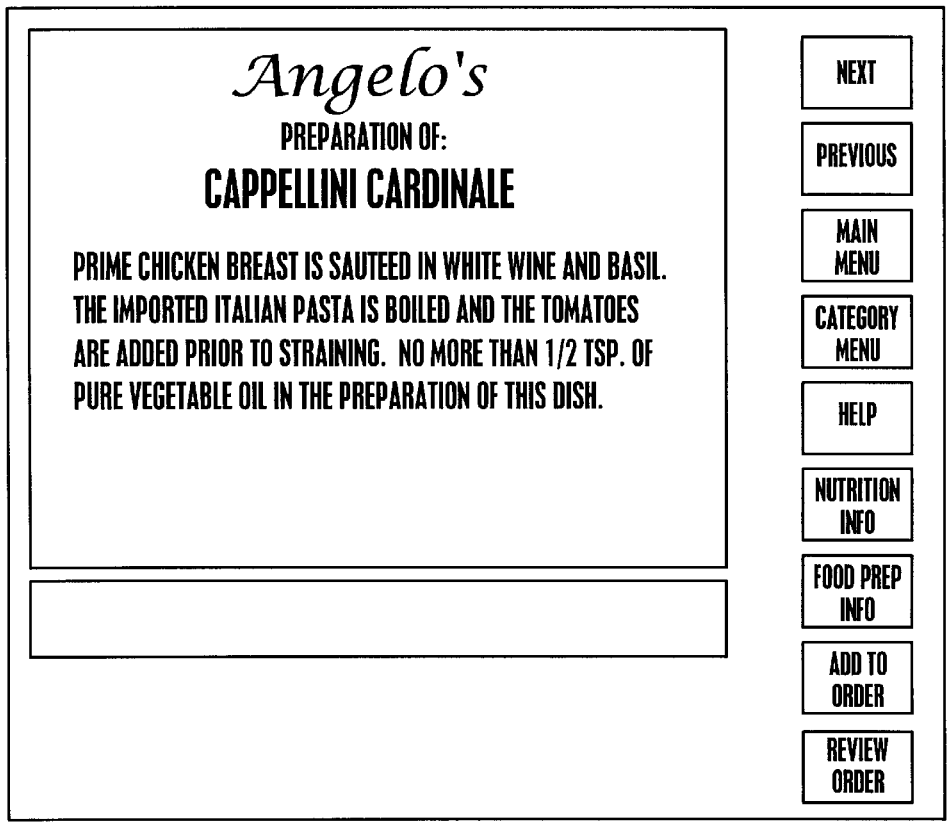
FIG. 12 is an exemplary Food Preparation display illustrating preparation of a menu item selection.

Once at state 1108, the system moves to state 1110 when the user selects a category such as Entrees (shown on FIG. 8). Once the selection is made, the system moves to state 1112 and displays the items in the selected category. The user selects an item (state 1114) from this category to view, i.e. Capellini Cardinale shown in FIG. 9. After the item is selected at state 1114, the system moves to state 1116 and displays the photo-realistic image of the menu item and the associated data (FIG. 10). Associated data displayed at state 1116 may include, but not be limited to data such as Ingredients and Nutrition Info (FIG. 11) and Preparation information (FIG. 12). At state 1116, the user may order the menu item displayed, which will move the system to state 1118. If the ordering option (state 1118) is chosen, the system moves to state 1120 and enters the order in the database. Once the order is entered in the database, the system moves to state 1122 to print the order and/or notify the Order Processing Terminal (124, FIG. 1) of the order.

At any of the above states, the user has the option of returning to the previous screen or the main menu (state 1102) to select other options. If no selections are made at the above states within the predetermined time, the system will revert to state 1104 and display the "screen saver".

C. View Restaurant Info Function

If the user selects View Restaurant Info (state 1124) at state 1102, the system moves to state 1126 and displays the restaurant data and photo-realistic images related to the restaurant, e.g. location, history, etc.

The user can return to the previous screen (state 1102) and select another option or, after the predetermined time period, automatically revert to state 1104.

D. View Miscellaneous Info Function

If the user selects View Miscellaneous Info (state 1128) at state 1102, the system moves to state 1130 and displays any data the restaurant may feel is pertinent, e.g. chefs or other staff, awards, publicity, etc.

The user can return to the previous screen (state 1102) and select another option or, after the predetermined time period, automatically revert to state 1104.

E. Help Function

Figure 13:
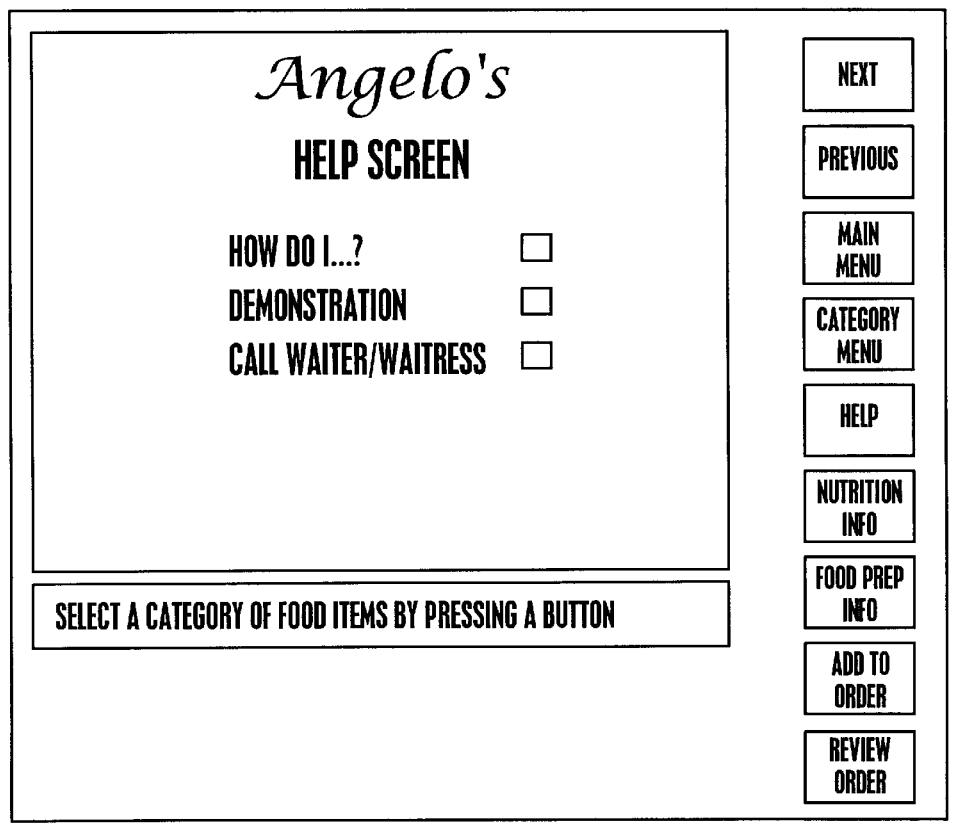
FIG. 13 is an exemplary Help display illustrating the help screen available at all times.

If the user selects the HELP function (state 1132) at state 1102, the system moves to state 1134 and displays Help information. An exemplary Help screen is shown in FIG. 13. The Help function may provide the user with information on various functions of the system, e.g. how to view desserts or how to review the order.

The user will have the option of returning to the previous screen (state 1102) and selecting another option or after the predetermined time period, the system will automatically revert to state 1104.

VI. ORDER PROCESSING

Figure 4:
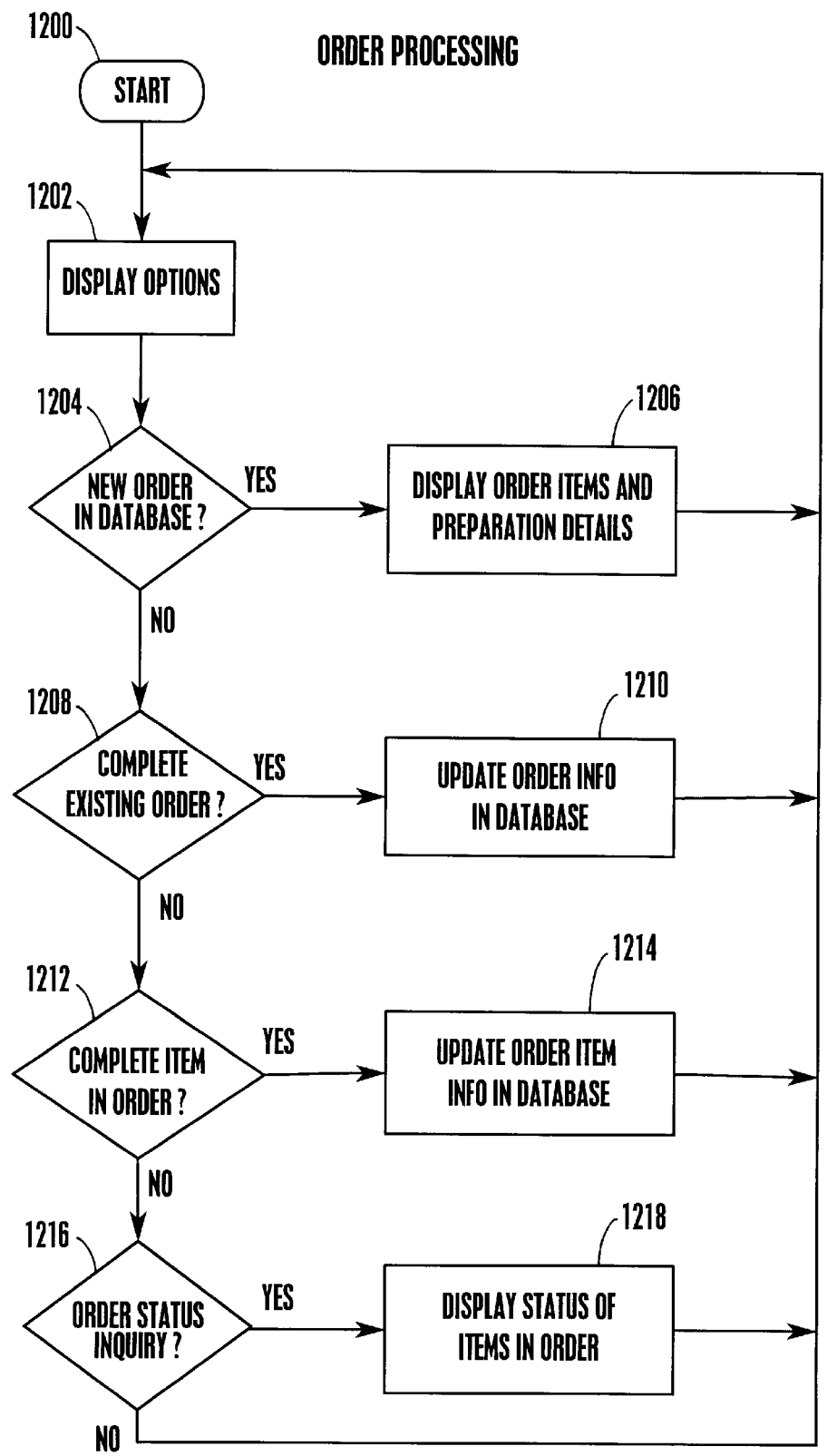
FIG. 4 is a flow diagram of the order processing implementations of the IVO system.

One of the functions of the IVO system is the capability of processing orders from within a restaurant or on a local system. (The local system is described in the General Configuration and FIGS. 1 and 2) An exemplary order processing function is shown in FIG. 4. The order processing function can only be utilized by authorized staff at the restaurant and is not available to the general public. The computer display will be configured so as to allow intuitive understanding of the functions by the user. At all states, except 1202, the staff person can return to the previous screen or return to the main menu at state 1202. FIGS. 14 and 15 show exemplary input screens which allow the staff user to access and implement the order processing functions.

A. Order Processing Interface

Referring to FIG. 4, a flow diagram of an order processing implementation within a restaurant or locally will be described. The interface by authorized staff starts at state 1200 where the order processing function is initialized. The system then proceeds to the main menu state 1202 to display options such as: New Order in Database (state 1204), Complete Existing Order (state 1208), Complete Item in Order (state 1212), and Order Status Inquiry (state 1216).

B. New Order in Database Function

If the New Order in Database option (state 1204) is selected at state 1202 Main Menu, the system will move to state 1206, Display Order Items and Preparation Details. At state 1206, the staff user accesses an existing order by number or other means of identification (FIGS. 14 and 15) and inputs the items ordered along with the preparation info.

C. Complete Existing Order Function

If the Complete Existing Order option (state 1208) is selected at state 1202 Main Menu, the system moves to state 1210, Update Order Info in Database. At state 1210, the staff user accesses an existing order by number or other means of identification (FIGS. 14 and 15) and updates order information and/or make additional entries to the existing order.

D. Complete Item In Order Function

If the Complete Item In Order option (state 1212) is selected at state 1202 Main Menu, the system moves to state 1214, Update Order Item Info in Database. At state 1214, the staff user accesses an existing order by number or other means of identification (FIGS. 14 and 15) and updates any/all items in that order.

E. Order Status Inquiry Function

If the Order Status Inquiry option (state 1216) is selected at state 1202 Main Menu, the system will move to state 1218, Display Status of Items in Order. At state 1218, the staff user can access an existing order by number or other means of identification (FIGS. 14 and 15) and display the status of any/all items in the selected order.

VII. REMOTE ORDERING

The Remote Ordering capabilities of the system allow for users on home PC's, user's at business locations, etc. to access restaurant information through the Wide Area Database Server (128, FIG. 1). This access will also be available through fax and modem lines, Internet, fiber optics, T1/T3 communications, cable television and broadband networks. The computer display is configured to allow intuitive understanding of the functions by the user.

A. Remote User Interface

Figure 5:
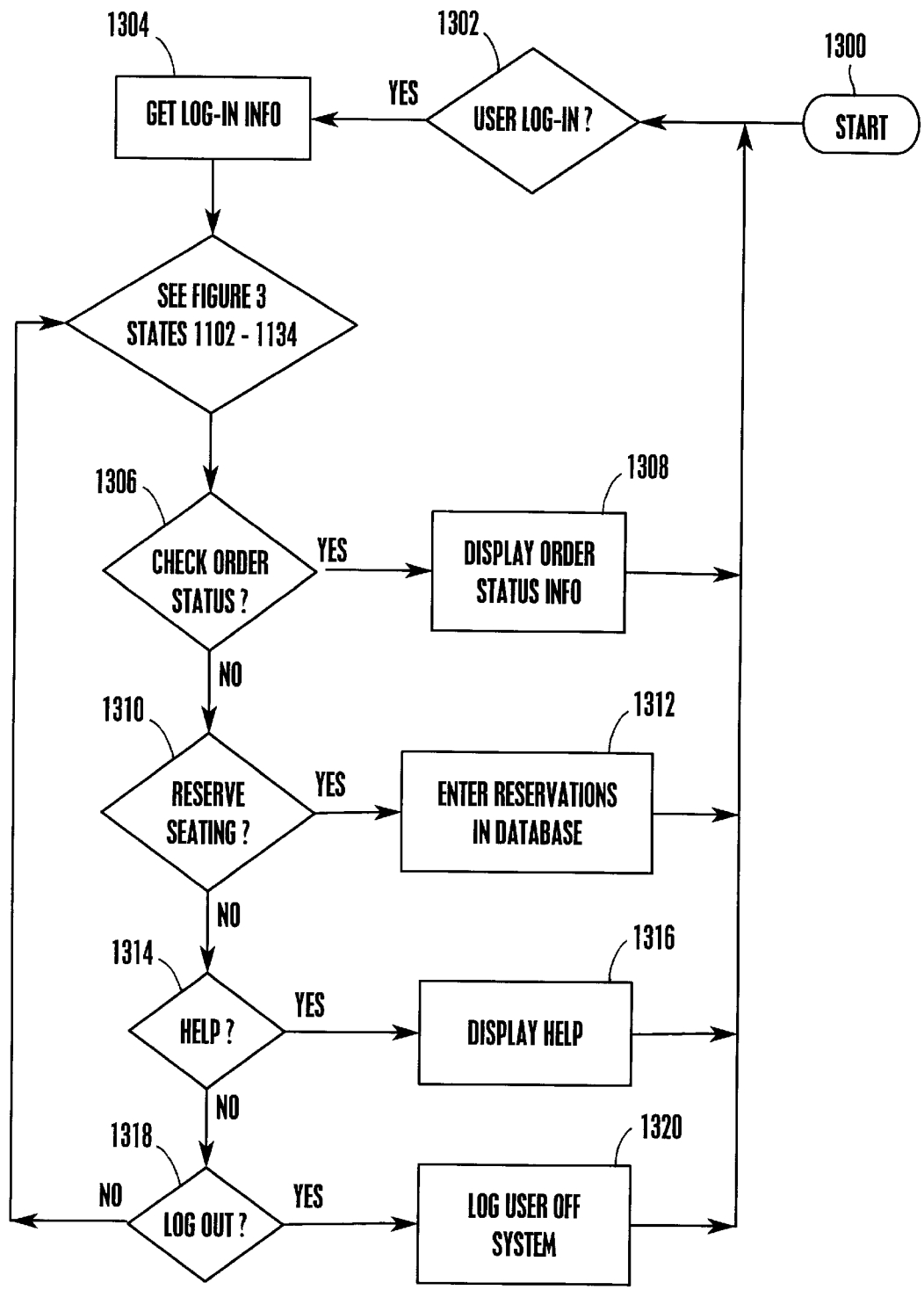
FIG. 5 is a flow diagram of the remote ordering and menu viewing implementation of the IVO system.

Referring to FIG. 5, a flow diagram of a Remote Order Processing Implementation will be described. A user can access the system beginning at state 1300 where the system is initialized, and then proceed to state 1302. At state 1302, the system checks for a log-in by the user and proceeds to state 1304 once the appropriate log-in is received. At state 1304, the system processes the log-in information provided by the user and allows access to the main menu shown in FIG. 3, state 1102. The remote user can then access all information as detailed in FIG. 3, states 1102 through 1134 in section V. In this implementation, the system offers additional options at the main menu screen (state 1102, FIG. 3 and FIG. 7), e.g. Check Order Status (state 1306), Reserve Seating (state 1310), Help (state 1314) and Log Out (state 1318). The computer displays are configured so as to allow intuitive understanding of the functions by the user.

B. Check Order Status Function

If the user selects Check Order Status (state 1306) at state 1102 (FIG. 1), the system moves to state 1308, Display Order Status Info. At state 1308, the system can access an existing order by number or other means of identification and display the status of any/all items in the selected order. If there is no input at this state, the system will automatically log the user off the system (state 1320) after a predetermined time period of inactivity, e.g. 45 seconds in order to ensure that the system is not logged on to inactive users.

C. Reserve Seating Function

If the user selects Reserve Seating (state 1310) at state 1102 (FIG. 1), the system moves to state 1312, Enter Reservations in Database. At state 1312, the user can reserve a block of time, e.g. 2 hours, at a restaurant and secure his reservation by inputting a credit card number. If there is no input at this state, the system will automatically log the user off the system (state 1320) after a predetermined time period of inactivity, e.g. 45 seconds in order to ensure that the system is not logged on to inactive users.

D. Help Function

If the user selects the Help function (state 1314) at state 1102, the system moves to state 1316, Display Help. An exemplary Help screen is shown in FIG. 13. The user can access information on all functions of the system, e.g. how to place an order or how to enter reservations. If there is no input at this state, the system will automatically log the user off the system (state 1320) after a predetermined time period of inactivity, e.g. 45 seconds in order to ensure that the system is not logged on to inactive users.

E. Log Out Function

If the user selects the Log Out function (state 1318) at state 1102, the system moves to state 1320 and logs the current user off the system. At state 1320, the system will automatically log the user off the system without any input from the user.

VIII. CONCLUSION

The embodiments disclosed herein for the interactive visual ordering system 100 can be extended to the purchase of other types of goods and services.

Although the invention has been described with reference to specific embodiments, the description is intended to be illustrative of the invention and is not intended to be limiting. Various modifications and applications may occur to those skilled in the art without departing from the true spirit and scope of the invention as defined in the appended claims.

What is claimed is:

1. A portable, interactive restaurant visual ordering system using photo-realistic images, the system comprising:
    a portable computer including a data input device;
    a video monitor electronically connected to the computer;
    a set of photo-realistic images digitally accessible to the computer;
    a set of food item characteristics digitally accessible to the computer and presentable in alphanumeric form, wherein at least some of the characteristics are associated with at least one of the images;
    computer readable code means digitally accessible to the computer for displaying one or more of the images and one or more of the characteristics associated with the image or images on the monitor in response to manipulation of the data input device and
    a wireless transmitter electronically connected to the computer and capable of transmitting signals generated by the computer in response to manipulation of the data input device to a kitchen area of the restaurant.

2. The system defined in claim 1, wherein the video monitor defines a visual display area, and the image comprises an area in a range of between 25% to 75% of the visual display area.

3. The system defined in claim 1, wherein the image is a full-color image.

4. The system defined in claim 1, wherein the system additionally comprises a database structure having a plurality of database objects organized in at least one database file, wherein each database object includes a plurality of database items, and wherein database items of a same type are stored in the same database file.

5. The system defined in claim 1, wherein the system additionally includes a configuration process capable of generating a sequence of steps for presenting menus to the customer.

6. The system defined in claim 5, wherein the system additionally includes a configuration file capable of storing the sequence of steps for presenting menus to the customer, said configuration file executed by the computer under interactive control of the customer.

7. An interactive restaurant visual ordering system utilizing photo-realistic images, the system comprising:
    a first subsystem in a restaurant, comprising:
        a first computer with a memory;
        a color visual display electronically connected to the computer;
        a set of photo-realistic images stored in the memory;
        a restaurant menu stored in the memory, a portion of said menu displayed on the visual display;
        a computer program stored in the memory enabling a customer of the restaurant to order at least one menu item, wherein the computer displays a full-color image representative of at least one menu item to the customer on the visual display, and wherein the program controls the display of the image based on interactive use of the menu on the computer by the customer;
    a second subsystem in the restaurant, comprising:
        a second computer with a memory;
        a color visual display electronically connected to the computer;
        a set of photo-realistic images stored in the memory;
        a restaurant menu stored in the memory, a portion of said menu displayed on the visual display;
        a computer program stored in the memory enabling a customer of the restaurant to order at least one menu item;
    a network of interactive visual ordering subsystems, wherein each subsystem additionally includes a wireless transmitter electronically connected to the respective computer capable of transmitting the at least one ordered menu item to a kitchen area of the restaurant.

8. The system defined in claim 4, wherein the images are alternatively stored in a server that is part of the network.

9. The system defined in claim 4, wherein the ordered menu items are accumulated at one computer.

10. The system defined in claim 7, wherein at least one computer is located in each of a plurality of restaurants.

11. The system defined in claim 10, wherein the computer/subsystems in the plurality of restaurants may communicate electronically with one another for the purpose of providing menu and ordering services from multiple vendors.

12. The system defined in claim 7, wherein the system has the ability to allow off-site computers/terminals to electronically communicate with the system for the purpose of receiving menu information and ordering.

13. The system defined in claim 12, wherein the off-site computers/terminals may also communicate with the system to perform other functions such as reserving seating or inquiring about orders electronically.

14. A computer program product and a computer system including a video monitor, a central processing unit, and means coupled to the central processing unit for storing a database containing restaurant menu item characteristics and digitized photo-realistic images associated with the characteristics, comprising:

a data storage device including a computer usable medium having computer readable program means for permitting entry of user-generated input signals, the computer readable program means having:

computer readable code means for causing the computer system to display the images and one or more of the characteristics associated with the image or images in response to the user-generated input signals;

computer readable code means for generating a menu item order signal in response to the user-generated input signals; and a wireless transmitter for transmitting the menu item order signal.

15. The computer program product of claim 14, wherein the computer system includes a network of computers.

* * * * *